Figure 1:
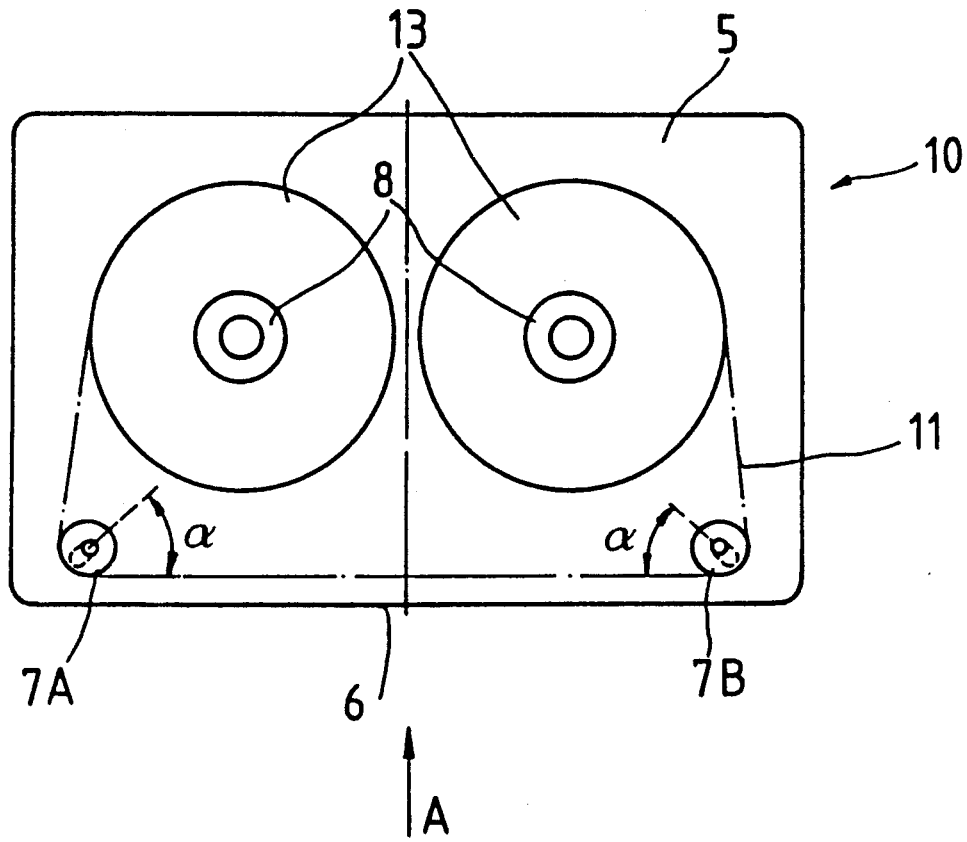

United States Patent [19]

Schoettle et al.

[11] Patent Number: 5,234,178
[45] Date of Patent: Aug. 10, 1993

[54] CASSETTE FOR A TAPE RECORDING MEDIUM, IN PARTICULAR A MAGNETIC TAPE

[75] Inventors: Klaus Schoettle, Heidelberg; Kurt Schmidts, Schwanau, both of Fed. Rep. of Germany

[73] Assignee: BASF Aktiengesellschaft, Ludwigshafen, Fed. Rep. of Germany

[21] Appl. No.: 375,471

[22] Filed: Jul. 5, 1989

[30] Foreign Application Priority Data

Jul. 6, 1988 [DE] Fed. Rep. of Germany ... 8808630[U]

[51] Int. Cl.⁵ .................. G11B 23/04; B65H 27/00
[52] U.S. Cl. .................................. 242/199; 360/132; 226/194; 242/76
[58] Field of Search ............... 226/190, 194; 242/199; 360/76, 132

[56] References Cited

U.S. PATENT DOCUMENTS

| | | | |
|---|---|---|---|
| 3,804,351 | 4/1974 | Kaneko et al. | 242/199 |
| 3,884,430 | 5/1975 | Martin | 242/76 X |
| 4,306,673 | 12/1981 | Santoro | 242/76 |
| 4,371,131 | 2/1983 | Okamura et al. | 242/199 |
| 4,640,473 | 2/1987 | Aoyama | 242/197 |
| 4,736,904 | 4/1988 | Schoettle et al. | 242/76 X |
| 4,919,356 | 4/1990 | Nakagawa | 242/76 X |

FOREIGN PATENT DOCUMENTS 8712577 12/1987 Fed. Rep. of Germany.

Primary Examiner—Daniel P. Stodola
Assistant Examiner—Paul T. Bowen
Attorney, Agent, or Firm—Keil & Weinkauf

[57] ABSTRACT

In a cassette for tape recording media, having a housing and one or more pegs which are molded as an integral part on the inner surface of the housing and help to determine the running of the tape recording medium, an accumulation of material arranged non-centrosymmetrically with respect to the mid-point of the base, for example an annular segment-like raised area and/or recess or support ribs having unequal volumes, is or are provided around the base of the peg, in order to set the predetermined vertical alignment of the peg. The peg can be, in particular, the spindle of a mobile tape guide element. A process for the production of such a peg by means of a special mold insert is likewise a subject of the invention. The invention can advantageously be used in all types of tape cassettes, such as film, audio, video, data and typewriter cassettes.

10 Claims, 4 Drawing Sheets

CASSETTE FOR A TAPE RECORDING MEDIUM, IN PARTICULAR A MAGNETIC TAPE

The present invention relates to a cassette for a tape recording medium, in particular a magnetic tape, on one or more tape rolls in a plastic housing and having one or more pegs which are molded as an integral part on the inner surface of the housing and which partly or completely determine the running of the tape recording medium, and a process for the production of such a peg by means of a special mold insert.

In the case of such pegs molded as an integral part in plastic housings, the pegs cannot be produced directly in a satisfactory vertical position since, for example, effects of material shrinkage during cooling of the plastic cause every peg to be inclined.

In the case of axles for mobile tape guide elements, such as guide rollers, guide levers, etc., the vertical position of the axles together with the tolerances of the axles themselves and of the tape guide elements is, however, critical for the quality of tape guidance and tape-/head alignment (owing to the azimuthal angle of the head gap). Furthermore, because of the inevitable cumulative effect of the tolerances, deviations from the required dimensions cause an increase in the required torque (of the recorder) during cassette operation and also during assembly of the cassettes.

German Utility Model 8,712,577 discloses a tape guide roller which is rotatably mounted on a spindle molded as an integral part of the cassette housing. Although the tape guide roller arrangement in the form of a cap roller with a special spindle can advantageously be used for avoiding noise during running, no measures are described for counteracting inadequate vertical alignment of the spindle due to production by injection molding.

It is an object of the present invention to improve the vertical alignment of the pegs in plastic cassette housings, in particular the spindle for mobile tape guide elements, by simple means and to provide a process for the production of such pegs.

We have found that this object is achieved, according to the invention, by a cassette for a tape recording medium, in particular a magnetic tape, on one or more tape rolls in a plastic housing and having one or more pegs which are molded as an integral part on the inner surface of the housing and which partly or completely determine the running of the tape recording medium, wherein an accumulation of material arranged non-centrosymmetrically with respect to the mid-point of the peg base is provided around the base of the peg, for predeterminable vertical alignment of the peg with respect to the inner surface of the housing.

Otherwise expressed, the principal novel feature of the invention is seen in that the peg is designed with an asymmetric distribution of material circumferentially of the axis of the peg, in such a way that inadequate vertical alignment of the peg due to cooling and shrinkage after the production of the cassette housing by injection-molding is counteracted.

As a result, the peg is pulled in a predetermined direction due to relatively pronounced material shrinkage in a zone around its foot, and a desired vertical alignment of the peg can therefore be preset.

In an advantageous embodiment, the peg can be a spindle for a movably mounted tape guide element, in particular for a rotatably mounted tape guide roller.

In another embodiment of the invention, the accumulation of material can be in the form of an annular segment-like raised or recessed area on the inner surface of the housing. The annular segment-like raised/recessed area can be very simply produced by means of a special mold insert during injection molding.

In another embodiment of the invention, if the peg is provided with support ribs, the support ribs around the base of the peg can have unequal volumes, in particular different thicknesses.

It is therefore also possible, for example, vertically to align spindles for cap rollers.

In practice, the support ribs may be in the form of three or more radial ribs, of which the middle rib has the greatest thickness.

In practice, the annular segment-like raised area can be arranged in an angular range of about 90°–270°, in particular about 180°, around the base of the peg.

In an advantageous embodiment, the angular area can be supplemented by forming a recess in the inner surface of the housing.

In practice, the raised/recessed area can have a height or depth, respectively, of about 0.2–0.6 mm, relative to the inner surface of the housing.

In the process for the production of pegs according to the invention, mold inserts having the following form are advantageously used.

A mold insert for a peg of the novel cassette can have a longitudinal hole and an end wall formed as a raised area or a recess and can be rotatable about the mid-point of the subsequent spindle and can be fixable.

Another mold insert for a peg of a novel cassette can be provided with a longitudinal hole for the spindle, and the support ribs having unequal volumes can be formed by means of corresponding grooves of different sizes in the inner surface of the longitudinal hole of the mold insert, and the mold insert can be rotatably arranged about the central axis of the longitudinal hole and can be fixable.

Each mold insert s furthermore formed with a radial marking, for example an incision, so that the mold insert can be reproducibly inserted in a predetermined angular position and can be fixed.

Contrary to the above object, a novel mold insert can also be used to realize a deliberate or essential inclined position of the spindle.

Embodiments of the invention are shown in the drawing and described below.

Figure 2:
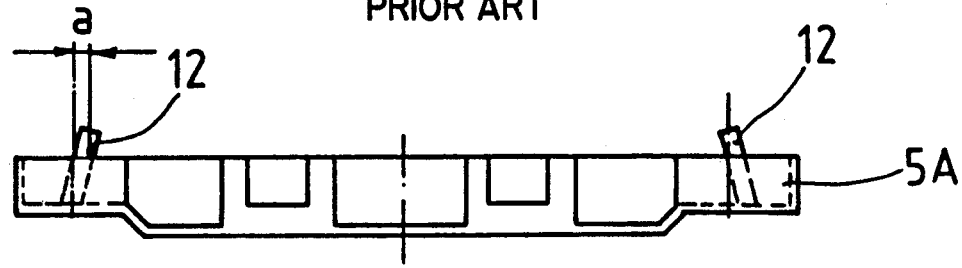
Figure 3:
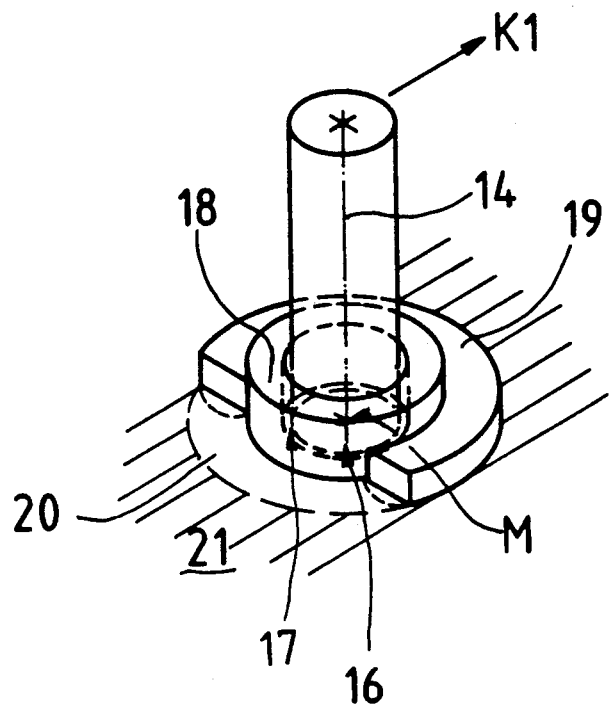
Figure 4:
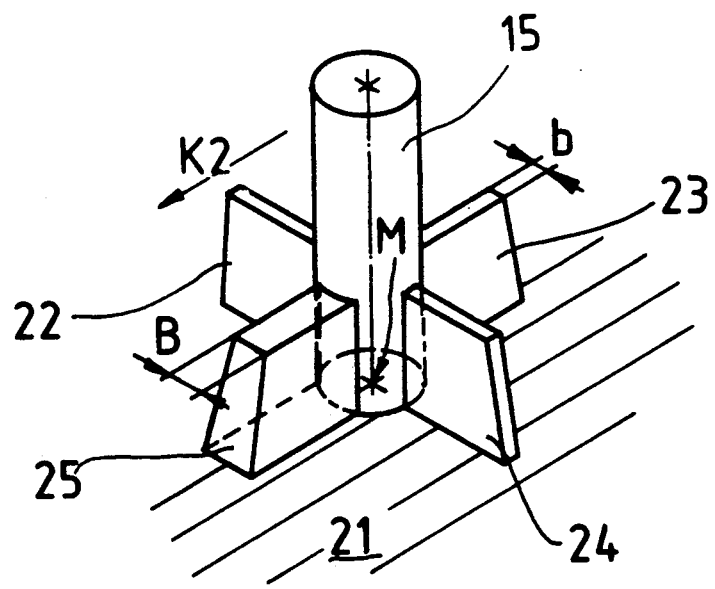
Figure 5:
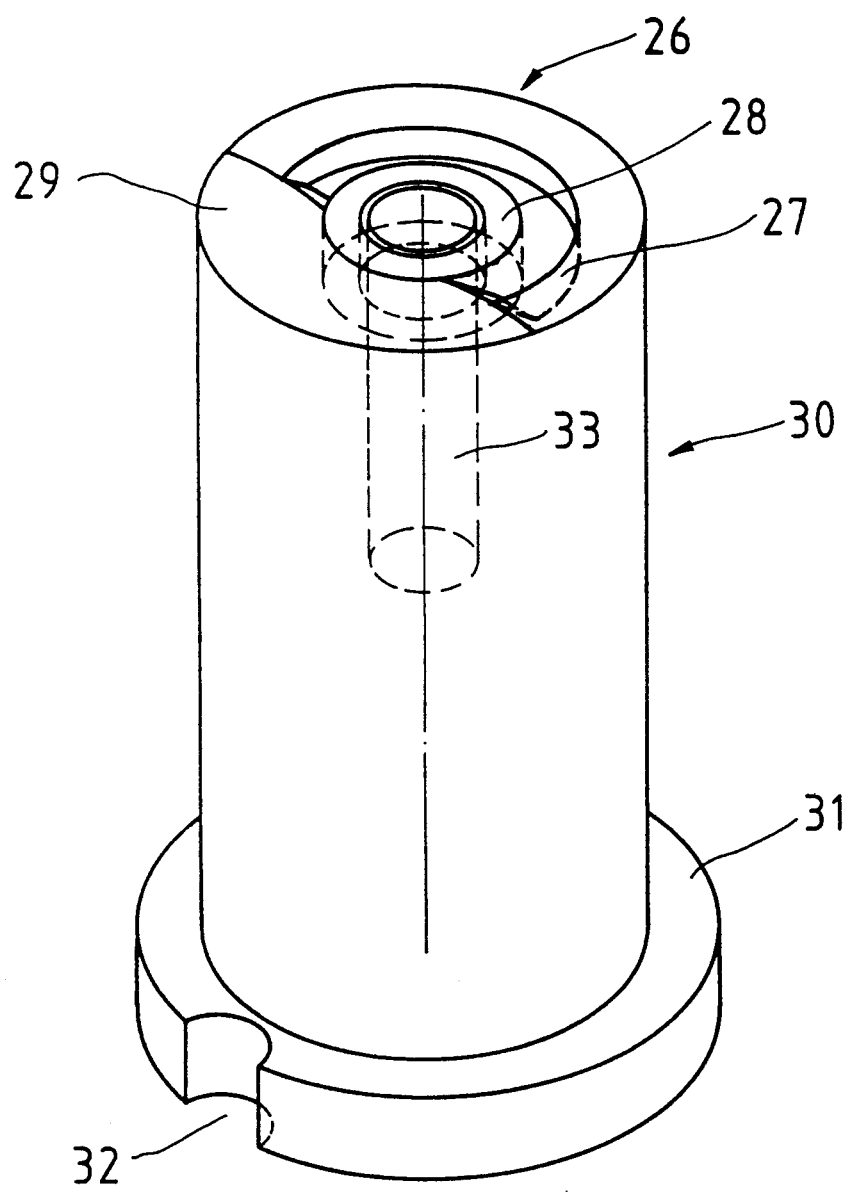
Figure 6:
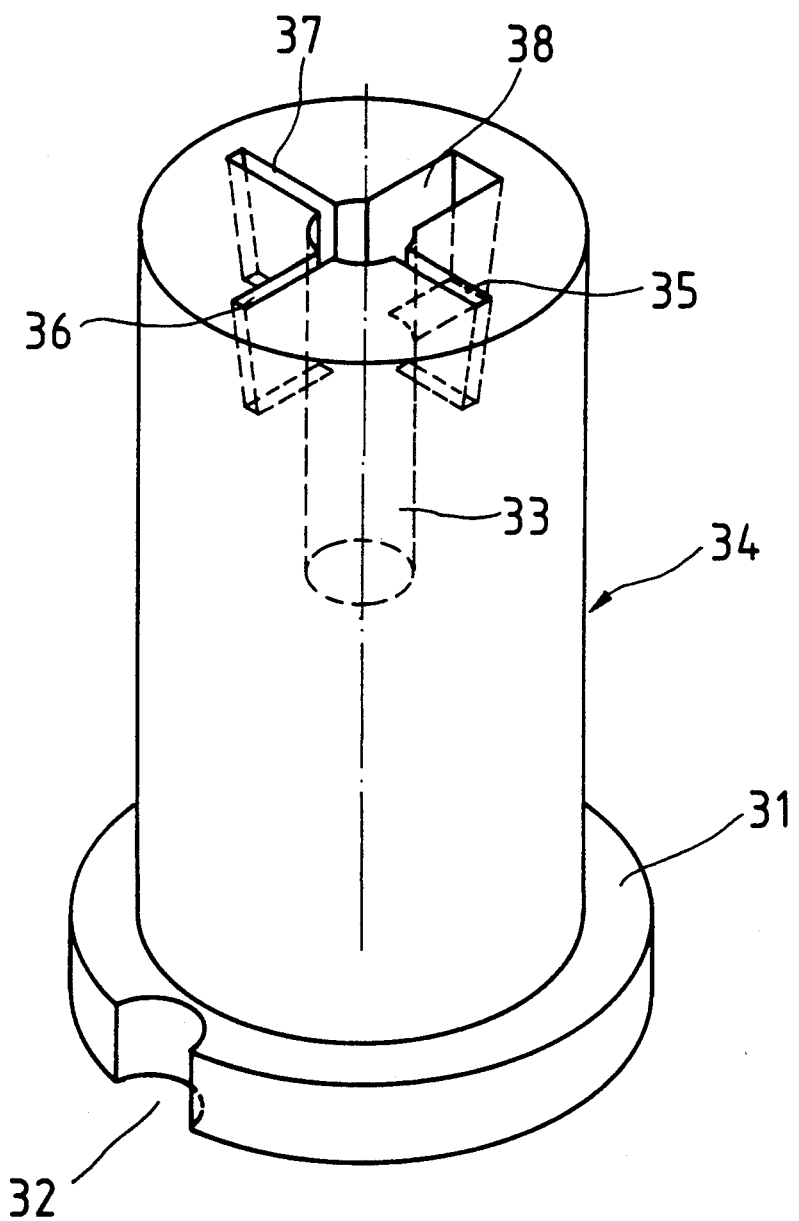

FIG. 1 shows a plan view of a compact cassette having guide rollers on spindles, FIG. 2 shows the cassette with the spindles in side view in direction A of FIG. 1, FIG. 3 shows a first novel peg in perspective, FIG. 4 shows a second novel peg in perspective, FIG. 5 shows a mold insert for the novel peg in FIG. 3, and FIG. 6 shows a further, mold insert for the novel peg in FIG. 4.

FIG. 1 schematically shows a cassette 10, for example a compact cassette, having two coplanar tape rolls 13, which are of the same size here. The cassette 10 also has a cassette housing 5 having a front 6 and deflection rollers 7 for the magnetic tape 11. The deflection rollers 7 are mounted on integral plastic spindles 12 which in this case are molded on and, in plan view (FIG. 2), are inclined toward the particular tape roll at an angle α of about 45°. In other embodiments of the cassette parts, other angles of inclination may be expected.

FIG. 2 shows the lower part 5A of the cassette housing 5 without the deflection roller 7 but with spindle 12, whose inclination toward the inner surface of the cassette housing 5 is clear. The lateral offset a of the spindle end in the actual position with respect to the required position (vertical) is about 40-50 μm according to the prior art, if no further measures are taken. The plastic used is high impact polystyrene 427 D (styrene/butadiene copolymer) from BASF Aktiengesellschaft, Ludwigshafen, Federal Republic of Germany. An offset of 40 μm at the most is still just tolerable.

Novel examples of spindles 14 and 15 are shown in FIGS. 3 and 4.

In FIG. 3, a narrow annular groove 17 is provided around the base 16 of the spindle 14, the groove being surrounded by a support or running edge 18 for the normal roller (with through-hole for mounting). A somewhat lower raised area 19, which may have a roughly rectangular cross-section or another cross-sectional shape, is provided around this running edge 18. The raised area 19 has an arc length corresponding roughly to an angle of 180°. The arc length may correspond to angles of from about 90° to about 270°, and the middle of the arc-shaped raised area 19 should be roughly in the direction of the desired vertical alignment force, denoted by K1 in this case. The height of the arc-shaped raised area 19 above the inner surface 21 is about 0.2-0.6 mm in the case of the abovementioned material. A groove 20 in the inner surface 21 of the cassette housing 5 can be provided to supplement circumferentially the annulus. The groove 20 is shown to have a slightly segment-shaped cross-section, but may have any shape which can easily be produced by injection molding.

As indicated in FIG. 3, the groove 20 can also be entirely dispensed with, with the result that the differences between the accumulations of material are not so great as with a groove.

FIG. 4 shows a spindle 15 for a cap roller (not shown), in which both a stable embodiment is provided and good vertical alignment according to the invention can be achieved by means of radial ribs 22-24 and 25. The rib 25 has a width B which is about 2-3 times as great as the width b of the other narrow ribs 22-24. The tensile force K2, which is generated by cooling and shrinkage after the production of the cassette housing 5 by injection molding, is thus applied. The total number of ribs should be not less than three, and the middle rib or ribs should have the greatest volume.

FIG. 5 shows an example of a mold insert embodiment 30 for a spindle 14 according to FIG. 3. An annular recess 27 of about 180°, which corresponds in shape to the arc-shaped raised area 19, is provided in the end wall 26 here, around the hole 33. A circular groove 28 corresponds to the shape of the running edge 18 and the raised bead 29 should serve to form the roughly 180° annular groove 20. A flange 31 on the mold insert 30 is provided with an incision 32 which serves to fix the insert 30 in the mold (not shown) after rotation about the longitudinal axis L into a desired angular position (i.e. into the optimal angular position) for the spindle 14 to be produced. The insert 30 should therefore have a shape such that it is rotatable.

These statements also apply, to the second spindle mold insert 34 to be described. Narrow radial slots 35-37 corresponding to the narrow radial ribs 22-24 of the spindle 15 extend from the central hole 33, and the substantially wider slot 38 corresponds to the broad radial rib 25 of the spindle 15. To improve mold release, the outer ends of the slots 35-38 are inclined. The position and the volume of the particular accumulation of material for vertical alignment of the spindle is also dependent on the particular plastic material used and its shrinkage behavior during injection molding.

With the abovementioned high impact polystyrene plastic, the lateral offset a of the spindle could be reduced from 40-50 μm to 10-20 μm, i.e. to half or less, with the result that both the rejection rate during cassette production and the functional reliability of the finished cassette could be substantially improved.

The description relates to spindles for tape guide rollers or deflection rollers in audio cassettes.

However, it is clear to the skilled worker that all measures for each type of guide peg can be used in the widest sense in any type of cassette, the aim being best possible vertical alignment of the peg.

Whenever a peg is molded as an integral part on the inner surface of the housing and partly or completely determines the running of the moving recording medium, the said peg is a guide peg.

Such guide pegs are either solid pegs or spindles or mobile guide elements, such as guide rollers, guide levers (as used, for example, in the safety mechanism SM ® in audio cassettes from BASF Aktiengesellschaft), guide foils or pressure foils (for example in video cassettes).

® Registered trademark of BASF Aktiengesellschaft, Ludwigshafen, Germany

We claim:

1. A cassette for a tape recording medium produced by injection molding having at least one tape roll in a plastic housing having an inner surface and having at least one peg which is molded as an integral part on said inner surface of the housing and which guides the running of the tape recording medium, wherein the peg has an asymmetric distribution of material circumferentially to the axis of the peg at its base, which counteracts inadequate vertical alignment of the peg due to cooling and shrinking after the production of the cassette by injection molding.

2. A cassette as claimed in claim 1, wherein the at least one peg is a spindle for a rotatably mounted tape guide roller.

3. A cassette as claimed in claim 2, wherein said asymmetric distribution of material is in the form of an arcuate raised segment on the inner surface of the housing.

4. A cassette as claimed in claim 1, wherein said asymmetric distribution of material is in the form of an arcuate raised segment on the inner surface of the housing.

5. A cassette as claimed in claim 4, wherein the arcuate raised segment is arranged in an angular region of from 90° to 270° around the base of the peg.

6. A cassette as claimed in claim 5, wherein the annular segment-like raised area is supplemented by forming a recess in the inner surface of the housing.

7. A cassette as claimed in claim 4, wherein the arcuate raised segment is arranged about 180° around the base of the peg.

8. A cassette as claimed in claim 4, wherein the arcuate raised segment has a height of 0.2-0.6 mm above the inner surface of the housing.

9. A cassette as claimed in claim 1, in which the peg is provided with a set of support ribs, wherein the support ribs extend as far as the inner surface of the housing and, as a set have unequal volumes.

10. A cassette as claimed in claim 9, wherein the support ribs are in the form of at least three radial ribs which, as a set, have unequal thicknesses, and of the at least three radial ribs, one of the ribs in opposite alignment with the shrinkage direction of the pegs has the greatest thickness.

* * * * *